UNITED STATES PATENT OFFICE.

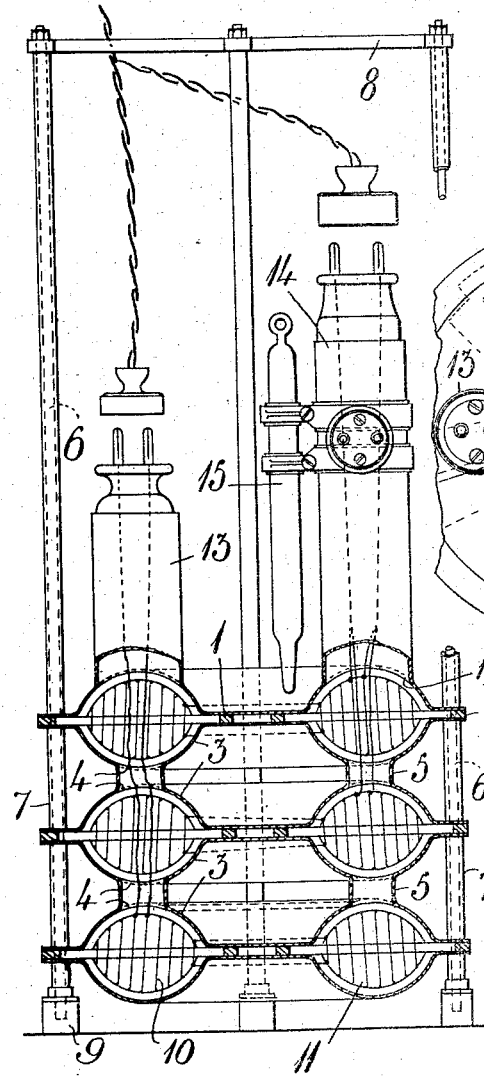
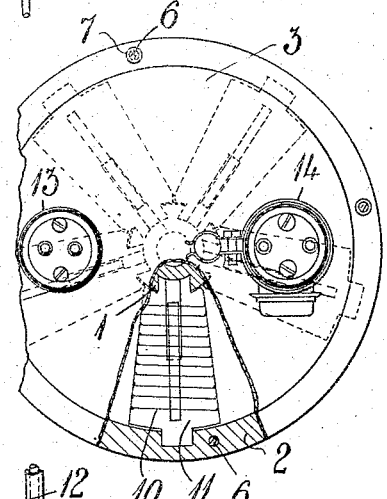
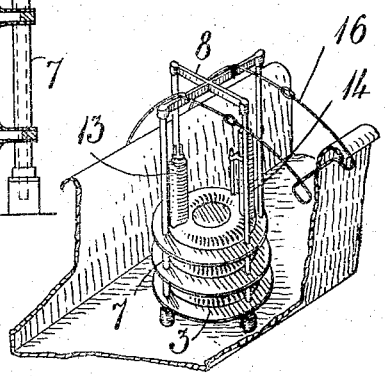

HJALMAR LÖFQUIST, OF STOCKHOLM, SWEDEN.

ELECTRIC WATER-HEATING DEVICE.

1,026,217.   Specification of Letters Patent.   Patented May 14, 1912.

Application filed October 14, 1911. Serial No. 654,636.

*To all whom it may concern:*

Be it known that I, HJALMAR LÖFQUIST, a subject of the King of Sweden, residing at 21 Birger-Jarls gatan, Stockholm, Sweden, have invented new and useful Improvements in Electric Water-Heating Devices, of which the following is a specification.

The present invention has for its object an electric heating device for water which is principally adapted for use in bath tubs and the like, although it also may be easily adapted for smaller or larger quantities of water.

According to the main feature of the invention the heater is composed of two or more substantially identical annular elements which are superposed and communicate with one another through channels, the casings of same being provided with openings in their front ends, whereby their interior spaces can be brought into communication with each other for the purpose of electric connections, air currents and for other purposes, the channels between the different annular elements being separated or kept air-tight from outside, for instance by soldering for which purpose the elements are provided with air-tight joints and are totally closed except for the above-mentioned openings.

An example of the invention is illustrated in the accompanying drawing, in which—

Figure 1 is a part vertical section of the heating device, Fig. 2 is a plan partly in section, and Fig. 3 is a perspective view on a smaller scale of the heating device with a holder, placed in a bath.

As already mentioned, the heating device is composed of two or more annular elements, the casings of which have in section for instance the lens shape shown in Fig. 1, so as to consist of practically the smallest possible number of parts, viz: an inner ring 1 and an outer ring 2 for supporting the resistance cores and the casing halves proper 3, 3. One or both of the latter are provided with openings 4, preferably annular and so situated as to lie opposite each other when the rings are placed one upon the other. In assembling the rings, they are preferably placed at some distance from each other, and their inner cavities are brought into communication with each other through sheet metal casings 5 surrounding the openings 4 and soldered to form tight joints. The channels thus formed serve to protect the connecting wires between the different resistance elements and also to provide free circulation of air through the apparatus and thus to prevent the collection of moisture which would cause damage to the insulation. For supporting and strengthening the rings they are also provided with bolts 6 at their outer edges, said bolts passing through all the rings or annular elements belonging to an apparatus and being surrounded, between said elements, by sleeves 7 of a length corresponding to the distance between the elements. These bolts are preferably connected, at their upper ends, by bars 8 and at their lower ends provided with rubber shoes 9 which will support the entire apparatus.

The resistance elements proper 10 consist of metal wires wound on cross-shaped cores 11 composed of two thin plates which are secured together only by their mutual engagement. In the example shown, five such resistance coils are provided in each annular element, the cores being radially arranged and guided at their inner and outer ends by the aforesaid rings 1 and 2 respectively. The cores may have any shape which may be suitable in view of the construction of the casing, the shape shown in the drawing being only an example.

The annular elements built up in the way now described may be joined together in any number, corresponding to the size of the vessel for which the apparatus is to be used, as all the elements are of practically the same construction. It is only to be observed, that the bottom ring should have no opening 4 on its lower side, and the top ring none on its upper side. This last mentioned ring is, on the contrary, provided with one or more other holes 12 connecting the same to ascending tubular extensions 13, 14 carrying terminals for the resistance wires at their upper ends. The advantage of building up the apparatus of several rings, the one laid upon the other in the way described, lies however not only in the readiness of manufacturing the same in any size, but also in the fact, that in a certain completed apparatus only one ring or a smaller number of rings need to be inserted in the circuit when small fluid quantities are to be heated, and that the temperature of the inserted part then will be practically as high as when the entire apparatus is inserted in the circuit. In the construction shown, the bottom ring only can for instance be inserted by means of the terminals on the shorter tube 13, while the terminals on the longer tube 14 embrace the two upper rings.

In the drawing also a couple of accessories of the apparatus are shown, which do not form part of the invention proper, that is a thermometer 15 secured to the vertical tube 14 and preferably arranged as a contact thermometer for breaking the circuit when the water surrounding the apparatus has reached a certain temperature, and a skeleton frame 16 of wire or the like for keeping the apparatus down on the bottom of the surrounding vessel, the lightness of the apparatus otherwise causing it to float on the water.

Having now particularly described the nature of my invention and the manner of its operation, what I claim is:

1. In electric water heating devices, in combination, a plurality of annular metal casings, each of said casings containing cores having metallic resistance elements wound thereon, said casings being superposed and connected together by watertight channels.

2. In electric water heating devices, in combination, a plurality of casings, each of said casings containing radially arranged cores having metal resistance wires wound spirally thereon, said casings being superposed and connected together by watertight channels.

3. In electric water heating devices, in combination, a plurality of casings, each of said casings containing cores having metallic resistance elements wound thereon, said casings being superposed and connected together by watertight channels, said casings being divided into groups, each group being provided with separate terminals, whereby any one of said groups may be utilized.

In testimony whereof I have signed my name to this specification in the presence of two subscribing witnesses.

HJALMAR LÖFQUIST.

Witnesses:
BIRGER NORDFELDT,
ADA SIMON.

---

Copies of this patent may be obtained for five cents each, by addressing the "Commissioner of Patents, Washington, D. C."